United States Patent
Ahuja et al.

(10) Patent No.: US 11,231,922 B2
(45) Date of Patent: Jan. 25, 2022

(54) SECURE AND FLEXIBLE PIPELINE MANAGEMENT TOOL

(71) Applicant: MASTERCARD INTERNATIONAL INCORPORATED, Purchase, NY (US)

(72) Inventors: Nikhil Ahuja, Wentzville, MO (US); Nevil Michael, O'Fallon, MO (US); Ari Kast, Glen Ridge, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/831,661

(22) Filed: Mar. 26, 2020

(65) Prior Publication Data
US 2021/0303296 A1  Sep. 30, 2021

(51) Int. Cl.
- *G06F 8/71* (2018.01)
- *G06F 11/36* (2006.01)
- *G06F 11/30* (2006.01)
- *G06F 8/65* (2018.01)

(52) U.S. Cl.
CPC .......... *G06F 8/71* (2013.01); *G06F 8/65* (2013.01); *G06F 11/302* (2013.01); *G06F 11/3664* (2013.01)

(58) Field of Classification Search
CPC ...... G06F 8/71; G06F 11/3664; G06F 11/302; G06F 8/65
See application file for complete search history.

(56) References Cited

U.S. PATENT DOCUMENTS

| | | | |
|---|---|---|---|
| 10,534,701 B1* | 1/2020 | Pande | G06F 11/3664 |
| 2017/0177324 A1* | 6/2017 | Frank | G06F 16/173 |
| 2018/0364985 A1* | 12/2018 | Liu | G06F 11/3664 |
| 2019/0205810 A1* | 7/2019 | Pojar | H04L 67/306 |
| 2019/0235847 A1* | 8/2019 | Nguyen | G06F 8/71 |
| 2020/0057619 A1* | 2/2020 | Owen | G06F 8/71 |

(Continued)

OTHER PUBLICATIONS

Unknown, "GitLab CI/CD Pipeline Configuration Reference", GitLab Docs, captured Sep. 20, 2019, https://docs.gitlab.com/ee/ci/yaml/, 48 pages.

(Continued)

*Primary Examiner* — Daxin Wu (57) ABSTRACT

A secure and flexible pipeline management solution includes determining, based at least on an order in which files are received, a precedence for defining variables, and when a file has multiple definitions for a variable, the order of appearance of the definitions defines precedence. A configuration file is generated with controlling definitions, which are based on the precedences, and a continuous integration continuous delivery (CI/CD) pipeline is executed dependent upon the configuration file. Multiple inheritances and string interpolation are supported. An advantageous result is a significantly simplified CI/CD pipeline that is secure, flexible, and is agnostic to the target environment. Thus, adding a new environment may not require the conventional (burdensome) task of adding further logical dependencies into the pipeline itself. The disclosed solution thus enhances efficiency and reduces errors when maintaining code bases.

20 Claims, 9 Drawing Sheets

(56) References Cited

U.S. PATENT DOCUMENTS

2020/0278916 A1\* 9/2020 Kuris ................. G06F 11/3664
2020/0394130 A1\* 12/2020 Pande ................. G06F 11/3692

OTHER PUBLICATIONS

Webb et al., "Introducing Spring Boot", Pivotal Software, Inc., copyright 2019, https://docs.spring.io/spring-boot/docs/2.1.8.RELEASE/reference/html/getting-started-introducing-spring-boot.html, 1 page.

\* cited by examiner

```
javatea:                          400
  parents:
    - tea
    - coffee
```

FIG. 5

```
tea3:                             500
  parents:
    - tea
  GLOBAL_ENV_VAR1: g_value
  condiments:
    NON_GLOBAL_ENV_VAR2: ng_value
    y: ng_value2
```

FIG. 6

```
tea4:                             600
  parents:
    - tea
  sweetener: "${TEMPERATURE} honey"
  organic: "locally grown organic"
  premium_sweetener: "${organic} delicious ${sweetener}"
```

SECURE AND FLEXIBLE PIPELINE MANAGEMENT TOOL

BACKGROUND

Organizations supporting multiple differing code bases on multiple differing computing environments, across multiple dispersed locations, face significant challenges when performing maintenance and updates. Continuous integration, continuous delivery (CI/CD) pipelines are commonly used to automate software delivery, testing, and deployment in such scenarios. In general, the CI/CD pipelines include jobs that define what to run (e.g., code compilation or test runs), and stages that define when and how to run.

Unfortunately, though, the CI/CD pipelines typically include large if/else/switch statements (or equivalent logic) to address the complex, widely ranging set of target environment variations. Environment-specific and application-specific logic and configurations are thus interwoven, and adding a new environment or location requires adding conditional logic into the pipelines. This can become a burdensome task. The lack of simplicity and flexibility to accommodate variations and special cases restricts reusability and reduces maintainability. Additionally, security can become compromised when each pipeline job cannot explicitly choose which set of values to trust, and a lack of version control precludes generation of a thorough audit trail for the various configurations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A secure and flexible pipeline management solution includes determining, based at least on an order in which files are received, a precedence for defining variables, and when a file has multiple definitions for a variable, the order of appearance of the definitions defines precedence. A configuration file is generated with controlling definitions, which are based on the precedences, and a continuous integration continuous delivery (CI/CD) pipeline is executed dependent upon the configuration file.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. The systems are illustrated as schematic drawings, and may not be to scale.

DETAILED DESCRIPTION

Aspects of the disclosure provide a system and method for a secure and flexible pipeline management solution that includes determining, based at least on an order in which files are received, a precedence for defining variables, and when a file has multiple definitions for a variable, the order of appearance of the definitions defines precedence. A configuration file is generated with controlling definitions, which are based on the precedences, and a continuous integration continuous delivery (CI/CD) pipeline is executed dependent upon the configuration file. Multiple inheritances and string interpolation are supported. An advantageous result is a significantly simplified CI/CD pipeline that is secure, flexible, and is agnostic to the target environment. Thus, adding a new environment may not require the conventional (and burdensome) task of adding further logical dependencies into the pipeline itself. The disclosed solution thus enhances efficiency for a user and reduces errors when maintaining code bases, thereby improving the human-machine interface.

The disclosed framework provides for a layered approach to environment configuration that satisfies the often contradictory goals of flexibility and security. The layered approach allows teams to quickly inherit a sensible set of default values, while at the same time retaining the power to override any of them as needed. This means that tangled nests of environment-specific if/else/switch statements in the pipeline code are rendered obsolete, because the combinatorial conditions are instead handled through the inheritance and override mechanisms in configuration files. Additionally, an ad-hoc deployment to a new environment intended to mirror another existing environment (e.g., for troubleshooting or testing purposes) is significantly simplified.

By freeing pipeline code from configuration-related branching logic, this framework realizes the goal of a pipeline that is agnostic to its target environment. At the same time, security is maintained because each pipeline job explicitly chooses which set of values to trust. Since configurations are version controlled, an audit trail can be maintained.

Figure 1:
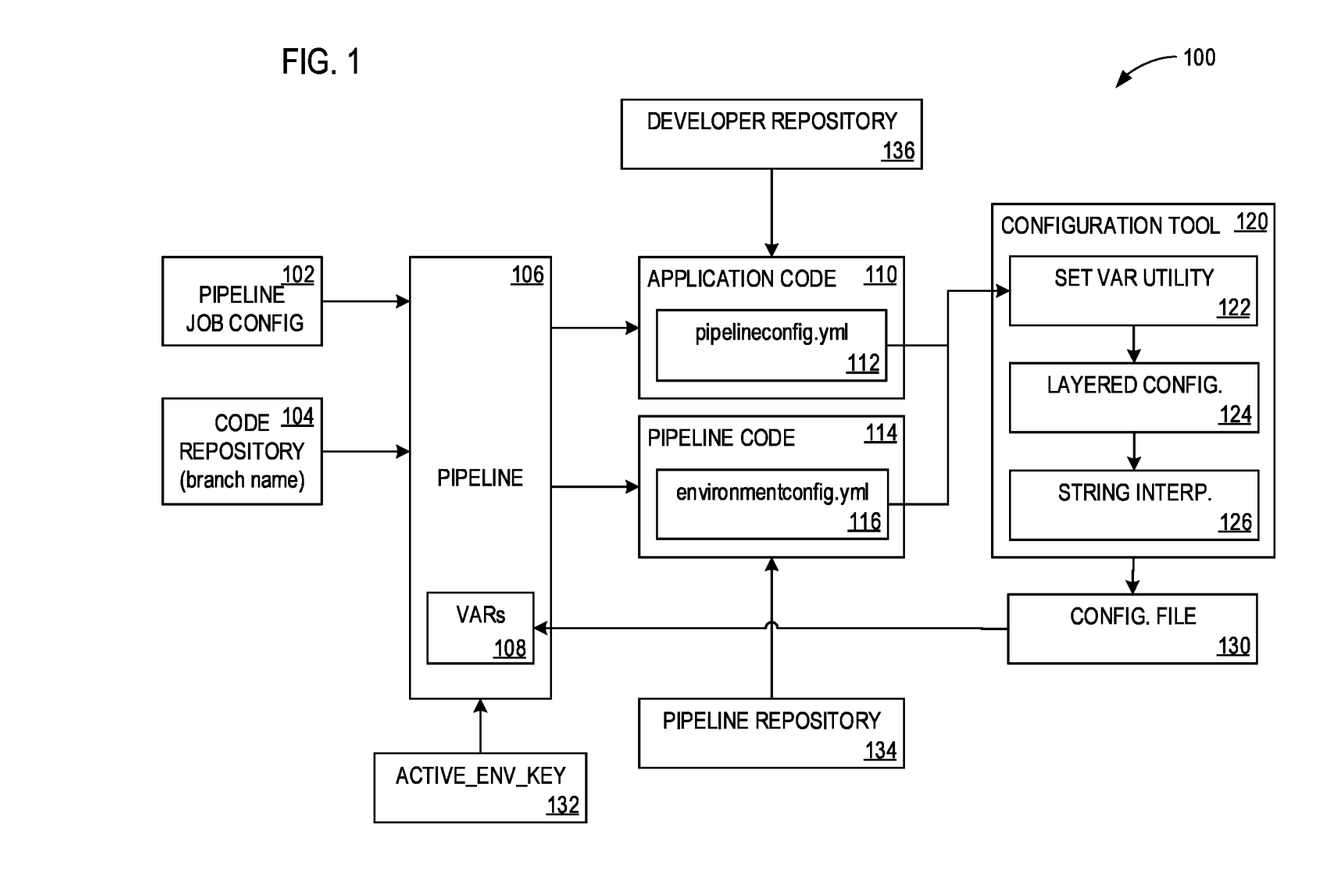
FIG. 1 is an exemplary block diagram illustrating a tool configured for secure and flexible pipeline management.

FIG. 1 is a block diagram of an exemplary pipeline management framework 100, which is configured for secure and flexible management of a pipeline 106. In some examples, the pipeline 106 is a CI/CD pipeline. The framework 100 includes a pipeline job config. 102, which in some examples is a Jenkins job set-up page. Jenkins is a server-based solution for automating the non-human part of software development processes, with continuous integration and facilitating technical aspects of continuous delivery. In some examples, the pipeline job config. 102 specifies an ACTIVE_ENV_KEY 132, which (if specified) provides the top-level key for the pipeline execution. A code repository 104 (e.g., a Git repository) provides a branch name, which is used as the top-level key for the pipeline execution, if the ACTIVE_ENV_KEY 132, is not specified.

The pipeline 106 will execute, after a kick-off, using VARs 108, which specify variable values, for example global environment variable values. The values in VARs 108 are selected by a configuration tool 120, as will be described. A pipeline repository 134 furnishes pipeline code 114, which includes a file 116 having critical definitions that should be preserved. An example file 116 is shown as environment-config.yml. This file 116 is the central file to be used by the various developers. A developer repository 136, that is specific to individual developers and/or projects, furnishes application code 110, which includes a file 112 having application-specific definitions that, if they conflict with the definitions in file 116, will be discarded in favor of the definitions in file 116. An example file 112 is shown as pipelineconfig.yml. In some examples, the files 116 and 112 have the same structure, which is similar to the structures shown in FIGS. 3-6 and 8.

In some examples, the file 116 (e.g., environmentconfig.yml), is controlled by the primary pipeline team and lives with the pipeline code; the file 112 e.g., pipelineconfig.yml) is with the developer and lives with the component code being deployed. Definitions can be freely mixed across files 116 and 112, with the caveat that file 116 wins in case of a conflict. This way, certain important definitions (such as "prod", or a set of core baselines) can be centrally controlled and never overridden. Yet, at the same time, the file 112 allows teams the efficiency of ad-hoc definitions for local purposes (e.g., lower environments) without the burden of dealing with a centrally controlled bureaucracy. Definitions in the file 112 may even inherit and tweak definitions from the file 116. Such tweaks do not affect the parent key definition in the file 116, so anyone else using the parent key remains unaffected.

The configuration tool 120 reads (or receives) the files 116 and 112. In some examples, each of the files 116 and 112 has a definition for the same variable. The configuration tool 120 then determines, based at least on an order in which the files 116 and 112 are received (e.g., the file 116 is read prior to reading the file 112), the file 116 has precedence over the file 112 for defining the first variable. The configuration tool 120 selects the definition in the file 116 a controlling definition for the first variable, based at least on the determined precedence of the file 116. The configuration tool 120 generates the configuration file 130 with the controlling definition for the first variable. The controlling definition for the first variable is provided to VARs 108, and the pipeline 106 then executes dependent upon (according to) the configuration file 130. In some examples, the configuration file 130 includes skipped stages.

Exemplary pipeline execution stages include checkout, deploy, unit test, deploy, integration test, end-to-end (E2E). In some examples, the configuration file 130 and the pipeline job config. 102 are combined. Specific operations of the configuration tool 120, relative to set VAR utility 122, layered config. component 124, and string interpolation component 126, will be described in relation to FIG. 7. The framework 100 provides for an approach to run different pipelines for different environments, configurations, and variations of the pipeline flow without making pipeline code changes. This layered approach leverages reuse of default values, while preserving the ability to over-ride any of them.

Figure 2:
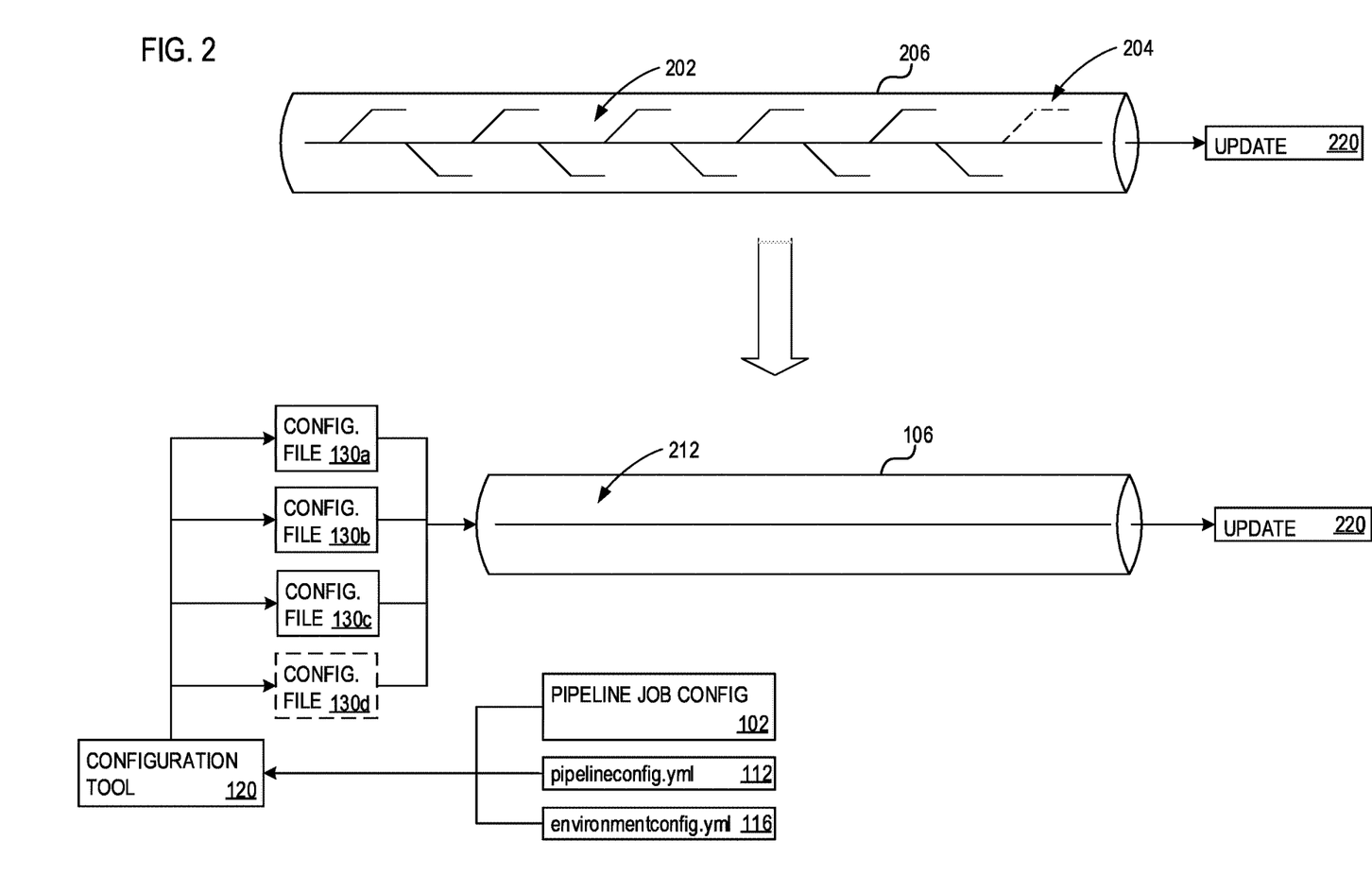
FIG. 2 illustrates an example conversion of a pipeline with interwoven environment-specific and application-specific logic and configurations to a pipeline that is agnostic to its target environment.

FIG. 2 illustrates an example conversion of a pipeline 206 with interwoven environment-specific and application-specific logic 202 and configurations to the pipeline 106 that is agnostic to its target environment. As can be seen in the illustrated example, the pipeline 206 has complex conditional branching logic 202, which is specific to its environment. For example, the branching logic 202 is so specific that a new application environment requires adding a new branch 204 to the logic 202. In contrast, the pipeline 106, with logic 212, eliminates the need for combinatorically nested code branches during the calculation of controlling configuration values (e.g., feature flags). Once calculated, however, each controlling value (or logical set of values) requires an un-nested branch in the code in order to actuate the behavioral directive being expressed by the controlling value.

As described previously, the configuration tool 120 reads (or receives) files 116 and 112, in a specific order that determines which file has precedence. The configuration tool 120 also reads information from pipeline job config. 102, in some examples. The configuration tool 120 then writes an application and environment-specific configuration file, for example one of configuration files 130a-130d, which is ingested by the pipeline 106 for controlling its execution. In contrast with adding a new logic branch 204, as is required by the pipeline 206, with the pipeline 106, a new application and/or environment merely results in a new configuration file (shown as the configuration file 130d with dashed lines, to match the dashed lines of new branch 204). This file is generated automatically, reducing the workload burden on the developer or other person running the pipeline 106. Both of the pipelines, pipeline 206 and pipeline 106, are able to modify the host environment with a code update operation 220, however, the workload burden is advantageously reduced when using the pipeline 106.

Figure 3:
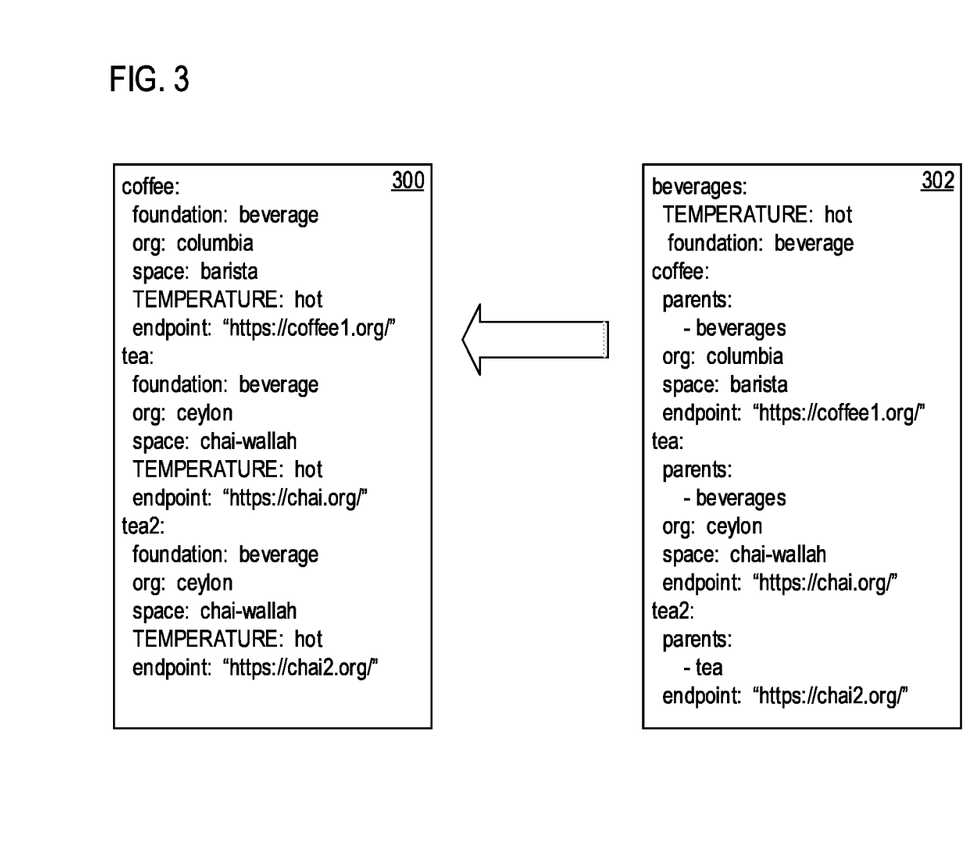
FIG. 3 shows an exemplary set of parameters refactored using parent keys from which attributes may be inherited.

FIG. 3 shows an exemplary set of parameters refactored using parent keys from which attributes may be inherited. A file 302 represents an original input file that is read (received) by the configuration tool 120, and a file 300 is derived from file 302. That is, file 302 is transitioned into file 300, which has three keys: coffee, tea, and tea2. Both coffee and tea have some commonality, specifically TEMPERATURE (which is a global environment variable) and foundation. Both tea and tea2 have commonality because tea is the parent of tea2. However, in tea2, the endpoint is overridden. For the file 302, the common variables in coffee and tea, specifically, TEMPERATURE having a value of hot, and foundation, having a value of beverage, are inherited by each coffee and tea. This is indicated by each coffee and tea having a parents field that specifies inheritance from the key beverages.

Additionally, the file 302 has a fourth key: tea2. The key tea2 inherits variables and values from its parent, tea, but replaces one of the values. Specifically, the value for endpoint is changed from https://chai.org to https://chai2.org. So, for example, within the key tea2, the value for the variable endpoint is first (earlier) assigned as https://chai.org, because the definition of the key tea appears earlier within the file 302 than does the definition of the key tea2. The definition of the key tea is used for the key tea2 because the key tea2 inherits from the key tea. But then, the later definition of the variable endpoint (as https://chai2.org) is given precedence, due to the order of appearance within the file 302. Note, however that the value of the variable endpoint for the key tea is unaffected by the later definition of endpoint for the key tea2. This is because inheritance is only one way. That is, the variable endpoint for the key tea and the variable endpoint for the key tea2 are actually different variables (due to residing in different keys). The value of the variable endpoint for the key tea is initially assigned to the variable endpoint for the key tea2, but anything that changes the value of the variable endpoint for the key tea2 only changes a different variable, and so does not affect the value of the variable endpoint for the key tea. Thus other consumers reliant upon the original definition of "tea" remain unaffected and secure, while certain consumers who wish to use the refined "tea2" set of variables may do so by explicitly specifying "tea2" rather than "tea" as their master key.

Figure 4:
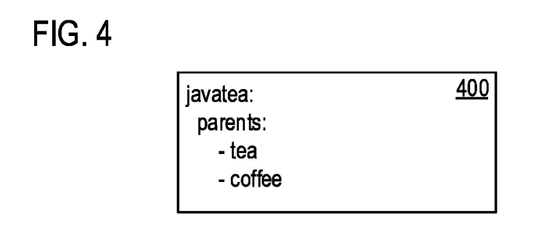
FIG. 4 shows an example of multiple inheritances.

FIG. 4 shows an example of multiple inheritances. A file 400 has a key javatea that has inheritances from parents tea and coffee. For any variables that are common, the order in which the parents appear in the file 400 is used to determine precedence. For example, if precedence is given to the final (latest) appearance of a key in the inheritance section (named parents in the illustrated example) then variable definitions in coffee will control, and definitions for the same variables in tea will be discarded. Keeping the order scheme the same (e.g., the latest appearance is given precedence), swapping the order so that coffee appears earlier and tea appears last, precedence will then be given to tea, over coffee.

Figure 5:
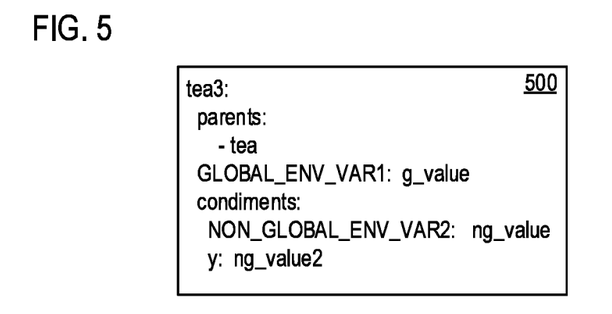
FIG. 5 shows an example of global variables.

FIG. 5 shows an example of global environment variables. A file 500 has a key tea3, and a global environment variable: GLOBAL_ENV_VAR1. The global environment variable GLOBAL_ENV_VAR1 is in the first tier from the root key (e.g., having a root distance of 1) become global environment values in the pipeline environment. The variable NON-GLOBAL_ENV2 is not a global environment variable, because it us under condiments, and so has a root distance greater than 1. In some examples, global environment variables can be accessed through standard (native) global variable access mechanisms. In some examples, non-global variables can still be accessed, but just not through standard (native) global variable access mechanisms.

Figure 6:
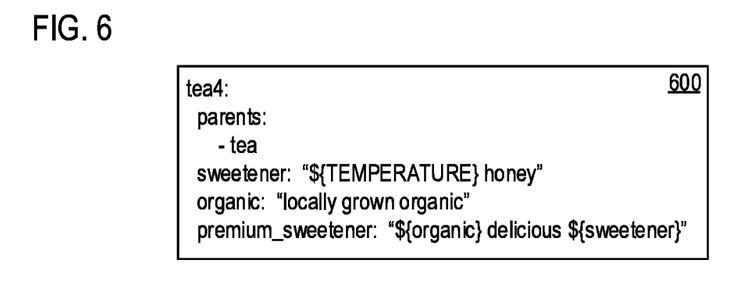
FIG. 6 shows an example of string interpolation.

FIG. 6 shows an example of string interpolation via substitution, for example, determining a definition for a variable based at least on a controlling definition of another variable. A file 600 shows a key tea4 that inherits from the key tea. On the key tea (see FIG. 3), the variable TEMPERATURE has a value of hot, which is inherited by tea4, and not changed or superseded. The variable sweetener, has an initial definition $ {TEMPERATURE} honey that indicates a substitution of the value of TEMPERATURE because of the ${ } notation. The final value of sweetener is then hot honey. Similarly, the value of the variable premium sweetener takes on values from the variable organic and the variable sweetener, to become locally grown organic delicious hot honey.

Figure 7:
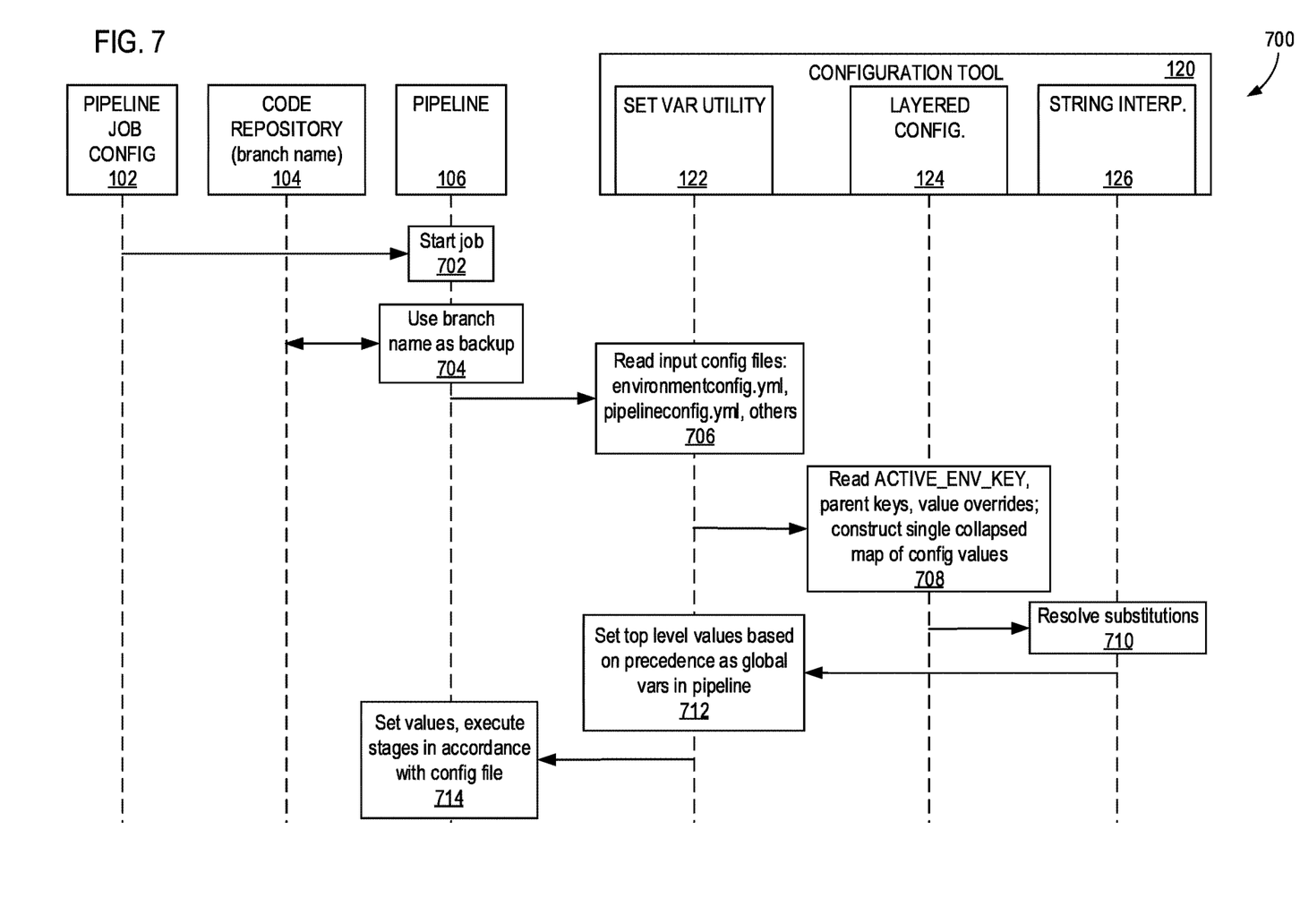
FIG. 7 is a sequence diagram illustrating operations and interactions of components of the tool of FIG. 1, according to an embodiment.

FIG. 7 is an exemplary sequence diagram 700 illustrating operations and interactions of components of the framework 100 of FIG. 1. The pipeline 106 initiates a run with a start job operation 702, and reads from job config. 102. Either the pipeline job config. 102 specifies the top-level key (as ACTIVE_ENV_KEY 102) or, as an alternative, the pipeline 106 uses the branch name from the code repository 104, in operation 704. In operation 706, the set VAR utility 122 within the configuration tool 120 reads the input config. files (e.g., the files 116 and 112), and based on the order in which the files were received, the order of multiple definitions within a same file for a variable, and the order of inheritance, selects controlling variable definitions. In operation 708, the layered config. component 124 reads ACTIVE_ENV_KEY 102, parent keys and value over-rides, and constructs a single collapsed map of the configuration values, as described in relation to FIG. 8.

The string interpolation component 126 of the configuration tool 120 resolves substitutions in operation 710, and as described in relation to FIG. 6. The set VAR utility 122 then sets top level values based on precedence as global environment variables, in operation 712. In operation 714, the pipeline 106 sets values (e.g., VARs 108 of FIG. 1) and executes in accordance with the configuration file, for example, by skipping specified stages.

Figure 8:
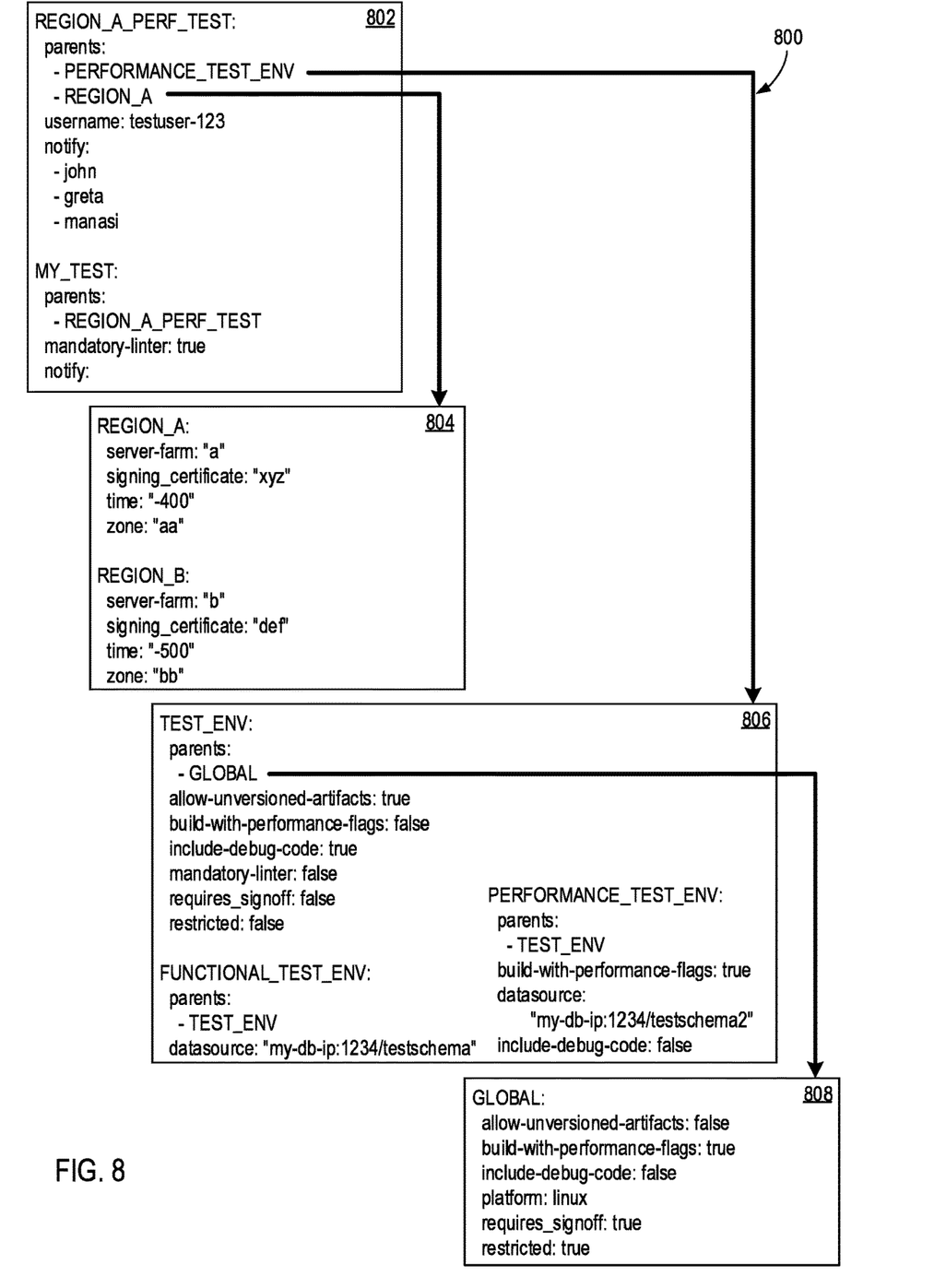
FIG. 8 shows an example of a layered configuration.

FIG. 8 shows an example of a layered configuration 800. A file 802 defines a key MY_TEST, which inherits from parent key REGION_A_PERF_TEST defined in the same file. REGION_A_PERF_TEST in turn inherits from two parent keys: REGION_A (defined in file 804) and PERFORMANCE_TEST_ENV (defined in file 806). PERFORMANCE_TEST_ENV in turn inherits from TEST_ENV (also in file 806), which itself inherits from GLOBAL as defined in file 808. Note that two other keys which were not explicitly included in this parent hierarchy (REGION_B and FUNCTIONAL_TEST_ENV) are effectively ignored when resolving the values for key MY_TEST. Upon traversing the hierarchy, the key MY_TEST is effectively collapsed to a single map of configuration values as derived from layered configuration 800. This enables the key MY_TEST to re-use and optionally over-ride any of the variables inherited from the keys REGION_A_PERF_TEST, REGION_A, PERFORMANCE_TEST_ENV, TEST_ENV, and GLOBAL. This ability to re-use and optionally over-ride is likewise true for all of the intermediary keys in the hierarchy. For example in this hierarchy we see that the key PERFORMANCE_TEST_ENV has over-ridden its inherited build-with-performance-flags value to be true. This modification is then passed down to all its children, so that the key MY_TEST will inherit a value of "true" for this field. This provision of re-use and over-rides simplifies and reduces the workload burden for developers and others running the pipeline 106 (of FIG. 1).

Figure 9A:
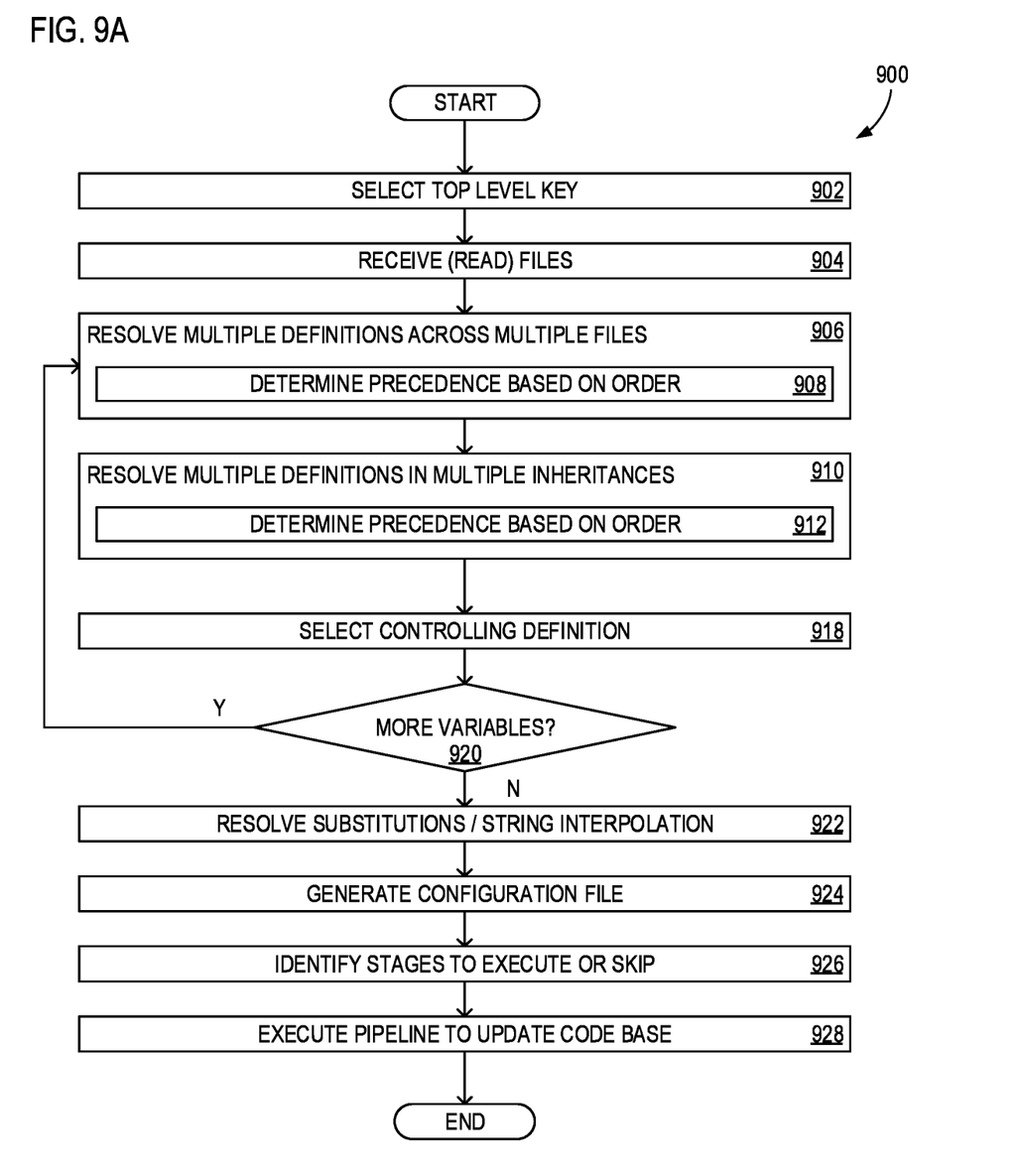
FIG. 9A is a flow chart illustrating operations associated with the tool of FIG. 1, according to an embodiment.
Figure 10:
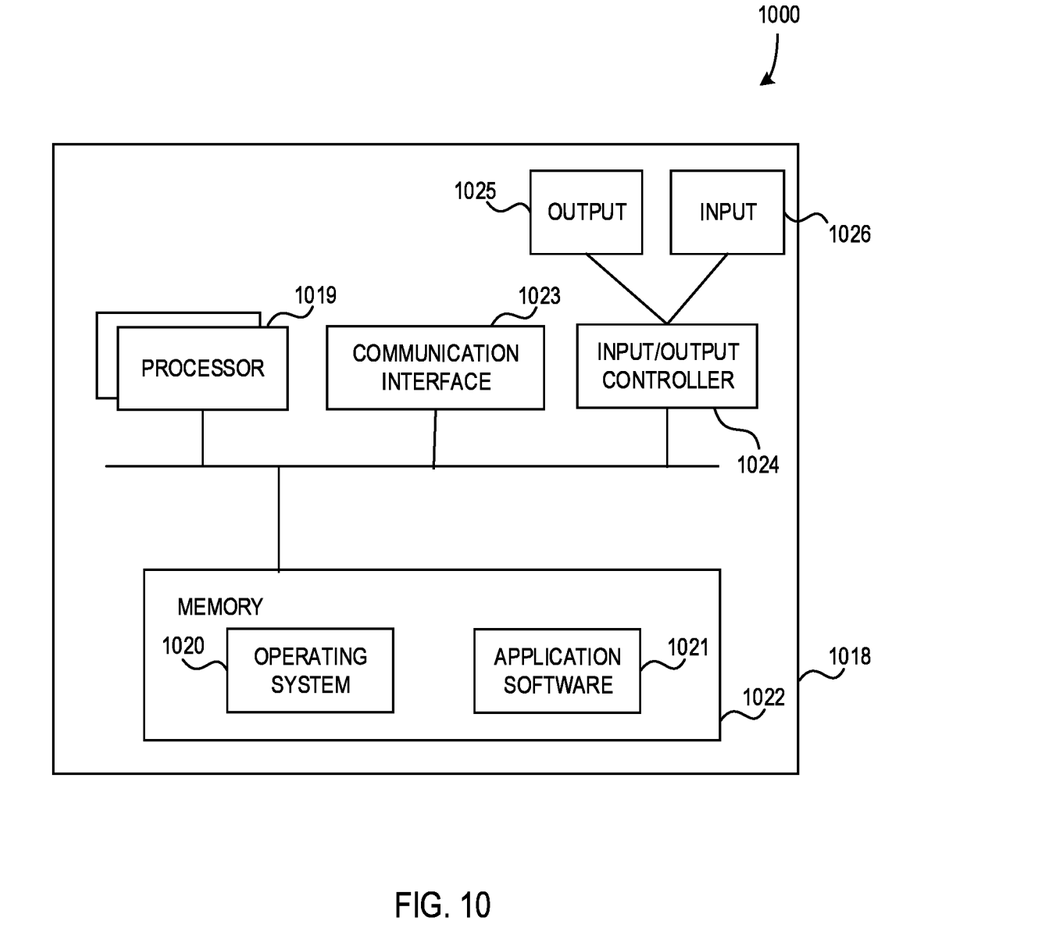
FIG. 10 illustrates a computing apparatus according to an embodiment as a functional block diagram.

FIG. 9A is an exemplary flow chart 900 illustrating operations associated with the framework 100 of FIG. 1. In some examples, at least some of the operations described for flow chart 900 are performed by a computing apparatus 1018 of FIG. 1000, or another suitable computational asset. Flow chart 900 commences with operation 902, which includes selecting a top-level key. In some examples, the top-level key is selected based at least on an environment name or a repository directory name. At 904, files (e.g., environmentconfig.yml, pipelineconfig.yml, and others) are received, for example, by being read into configuration tool 120 (of FIG. 1). In some examples, operation 904 includes receiving a first file containing a first definition for a first variable. In some examples, operation 904 further includes receiving a third file containing a third definition for the first variable.

Operation 906 includes resolving multiple definitions across multiple files, and is implemented using operation 908, that determines precedence based on the order in which a file is received (or read). The order in which the files are read (received) is specified in a script or configuration control file (e.g., pipeline job config. 102 of FIG. 1). In some examples, the earliest file that is received, that has a definition for a variable, has precedence, no matter how many subsequent files are received, that also have definition for the same variable. However, in some other examples, the latest (final) file that is received, that has a definition for a variable, has precedence, no matter how many earlier files had been received, that also have definition for the same variable.

Operation 910 includes resolving multiple definitions that appear within multiple inheritances, and is implemented using operation 912, that determines precedence based on the order in which a parent key is listed in the field for identifying parent objects. In some examples, the latest (final) parent key has precedence, whereas in some other examples, the earliest parent key has precedence.

The definition that has precedence, in the file that has precedence, is selected as the controlling definition in operation 918. So, for example, if operation 908 determines that, based at least on an order in which the first file and the second file are received, the first file has precedence over the second file for defining a first variable; and operation 916 determines that, based at least on an order in which a first definition and a second definition appear within the first file, then the first definition has precedence over the second definition for defining the first variable; and operation 918 selects the first definition as the controlling definition for the first variable. This selection is based at least on the determined precedence. Such a selection can extend across an arbitrary number of files and definitions within those files. For example, with three files, operation 918 may select, as the controlling definition for the first variable, the first definition, based at least on an order in which the first file, the second file, and a third file are received.

Decision operation 920 determines whether operations 906-918 are needed for resolving definitions for additional variables. For example, on a subsequent pass through operations 906-918, operation 918 may select a controlling definition for a second variable, based at least on a determined file precedence for a plurality of files each having a definition for the second variable. Operation 922 resolves substitutions via string interpolation, which may include determining a definition for a variable based at least on a controlling definition of another variable. Operation 924 generates a configuration file with the controlling definitions for all the relevant variables. The pipeline job is now nearly ready for kick-off. Operation 926 includes identifying stages for the pipeline (e.g., a CI/CD pipeline) to execute or to avoid executing. Stages that are avoided are "skipped" stages. Operation 928 then includes executing the pipeline dependent upon the configuration file. In some examples, executing the pipeline comprises executing the CI/CD pipeline in accordance with the stages identified for execution and the stages identified for avoiding execution.

Figure 9B:
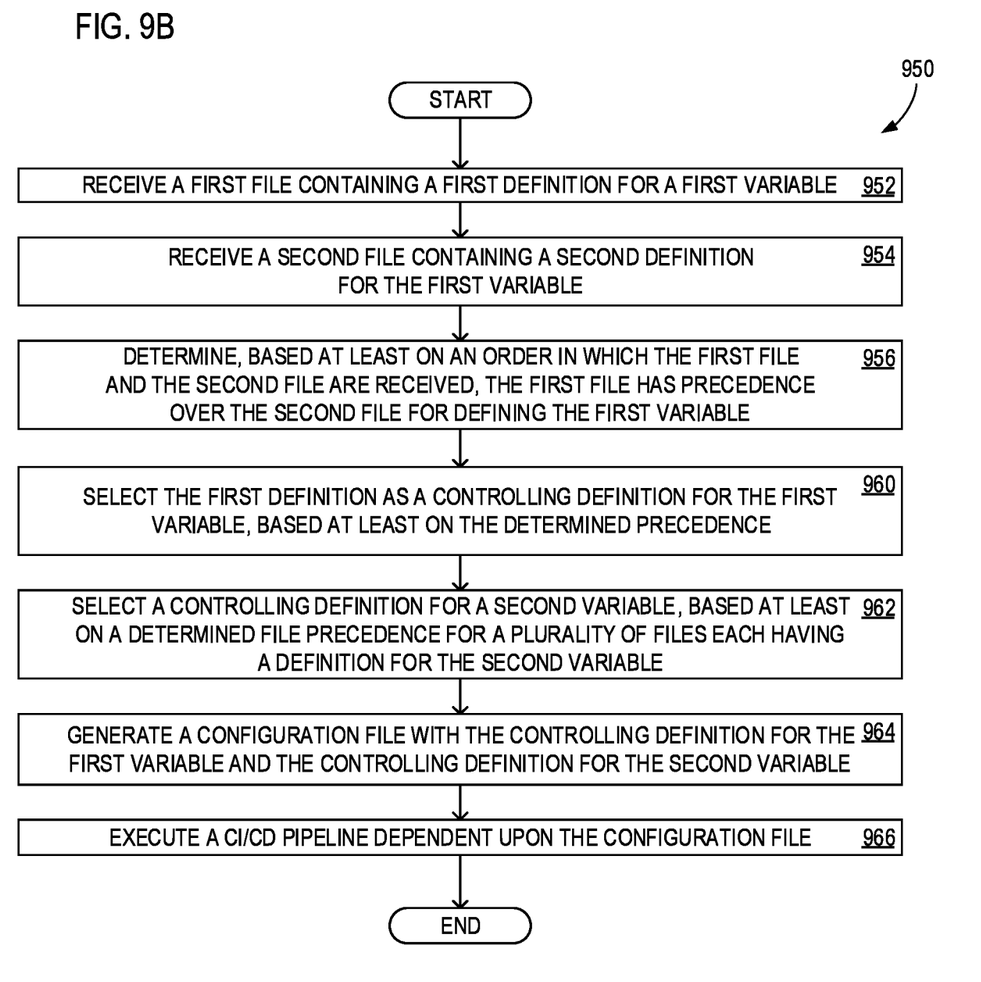
FIG. 9B is another flow chart illustrating operations associated with the tool of FIG. 1, according to an embodiment.

FIG. 9B is an exemplary flow chart 950 illustrating operations associated with the framework 100 of FIG. 1. In some examples, the at least some of the operations described for flow chart 950 are performed by a computing apparatus 1018 of FIG. 1000, or another suitable computational asset. Flow chart 950 commences with operation 952, which includes receiving a first file containing a first definition for a first variable. Operation 954 includes receiving a second file containing a second definition for the first variable. Operation 956 includes determining, based at least on an order in which the first file and the second file are received, the first file has precedence over the second file for defining the first variable. In some examples, the first file is received prior to the second file. In some examples, the second file is received prior to the first file. That is, in some examples, the earliest file is given precedence, whereas in some examples, the final file is given precedence.

Operation 960 includes selecting the first definition as a controlling definition for the first variable, based at least on the determined precedence. Operation 962 includes selecting a controlling definition for a second variable, based at least on a determined file precedence for a plurality of files each having a definition for the second variable. Operation 964 includes generating a configuration file with the controlling definition for the first variable and the controlling definition for the second variable. Operation 966 includes executing a continuous integration continuous delivery (CI/CD) pipeline dependent upon the configuration file.

Exemplary Operating Environment

The present disclosure is operable with a computing apparatus according to an embodiment as a functional block diagram 1000 in FIG. 10. In an embodiment, components of a computing apparatus 1018 may be implemented as a part of an electronic device according to one or more embodiments described in this specification. The computing apparatus 1018 comprises one or more processors 1019 which may be microprocessors, controllers or any other suitable type of processors for processing computer executable instructions to control the operation of the electronic device. Platform software comprising an operating system 1020 or any other suitable platform software may be provided on the apparatus 1018 to enable application software 1021 to be executed on the device. According to an embodiment, monitoring and auditing the failure and recovery of batch data tasks as described herein may be accomplished by software.

Computer executable instructions may be provided using any computer-readable media that are accessible by the computing apparatus 1018. Computer-readable media may include, for example, computer storage media such as a memory 1022 and communications media. Computer storage media, such as the memory 1022, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that the storage may be distributed or located remotely and accessed via a network or other communication link (e.g., using a communication interface 1023).

The computing apparatus 1018 may comprise an input/output controller 1024 configured to output information to one or more output devices 1025, for example a display or a speaker, which may be separate from or integral to the electronic device. The input/output controller 1024 may also be configured to receive and process an input from one or more input devices 1026, for example, a keyboard, a microphone or a touchpad. In one embodiment, the output device 1025 may also act as the input device. An example of such a device is be a touch sensitive display. The input/output controller 1024 may also output data to devices other than the output device, e.g., a locally connected printing device.

In some embodiments, a user may provide input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Examples of the disclosure include at least one processor, and at least one memory comprising computer program code, the at least one memory and the computer program code configured to, with the at least one processor, cause the at least one processor to:

receive a first file containing a first definition for a first variable;

receive a second file containing a second definition for the first variable; determine, based at least on an order in which the first file and the second file are received, the first file has precedence over the second file for defining the first variable;

determine, based at least on an order in which the first definition and the second definition appear within the first file, the first definition has precedence over the second definition for defining the first variable;

select the first definition as a controlling definition for the first variable, based at least on the determined precedence;

select a controlling definition for a second variable, based at least on a determined file precedence for a plurality of files each having a definition for the second variable;

generate a configuration file with the controlling definition for the first variable and the controlling definition for the second variable; and execute a continuous integration continuous delivery (CI/CD) pipeline dependent upon the configuration file.

Further examples of the disclosure include a computerized method for pipeline management, the computerized method comprising:

receiving a first file containing a first definition for a first variable;

receiving a second file containing a second definition for the first variable;

determining, based at least on an order in which the first file and the second file are received, the first file has precedence over the second file for defining the first variable;

determining, based at least on an order in which the first definition and the second definition appear within the first file, the first definition has precedence over the second definition for defining the first variable;

selecting the first definition as a controlling definition for the first variable, based at least on the determined precedence;

selecting a controlling definition for a second variable, based at least on a determined file precedence for a plurality of files each having a definition for the second variable;

generating a configuration file with the controlling definition for the first variable and the controlling definition for the second variable; and executing a continuous integration continuous delivery (CI/CD) pipeline dependent upon the configuration file.

Further examples of the disclosure include one or more computer storage media having computer-executable instructions for pipeline management that, upon execution by a processor, cause the processor to:

receive a first file containing a first definition for a first variable;

receive a second file containing a second definition for the first variable;

receive a third file containing a third definition for the first variable, determine, based at least on an order in which the first file, the second file, and the third file are received, the first file has precedence over the second file and the third file for defining the first variable;

determine, based at least on an order in which the first definition and the second definition appear within the first file, the first definition has precedence over the second definition for defining the first variable;

select the first definition as a controlling definition for the first variable, based at least on the determined precedence;

select a controlling definition for a second variable, based at least on a determined file precedence for a plurality of files each having a definition for the second variable;

receive a fourth file containing a plurality of parent keys, wherein each parent key has a definition for a third variable;

determine, based at least on an order in which the plurality of parent keys appear within the fourth file, a precedence for inheriting a controlling definition for the third variable;

generate a configuration file with the controlling definition for the first variable, the controlling definition for the second variable, and the controlling definition for the third variable; and execute a continuous integration continuous delivery (CI/CD) pipeline dependent upon the configuration file.

Alternatively, or in addition to the other examples described herein, examples include any combination of the following:

wherein the first file is received prior to the second file;

wherein the second file is received prior to the first file;

wherein the second definition appears earlier than the first definition within the first file;

wherein the first definition appears earlier than the second definition within the first file;

receive a third file containing a third definition for the first variable;

wherein select the first definition as a controlling definition for the first variable comprises select the first definition as a controlling definition for the first variable based at least on an order in which the first file, the second file, and the third file are received, and the order in which the first definition and the second definition appear within the first file;

receive a fourth file containing a plurality of parent keys, wherein each parent key has a definition for a third variable;

determine, based at least on an order in which the plurality of parent keys appear within the fourth file, a precedence for inheriting a controlling definition for the third variable;

wherein generating the configuration file further comprises generating the configuration file with the controlling definition for the third variable;

determine a definition for a fourth variable based at least on a controlling definition of another variable;

select a top-level key based at least on an environment name or a repository directory name;

identify stages for the CI/CD pipeline to execute or to avoid executing; and wherein executing the CI/CD pipeline comprises executing the CI/CD pipeline in accordance with the stages identified for execution and the stages identified for avoiding execution.

Any range or device value given herein may be extended or altered without losing the effect sought, as will be apparent to the skilled person. While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for pipeline management, the system comprising:
   at least one processor; and
   at least one memory comprising computer program code, the at least one memory and the computer program code configured to, with the at least one processor, cause the at least one processor to:
      receive a first file containing a first definition and a second definition for a first variable, the second definition being different from the first definition;
      receive a second file containing a third definition for the first variable;
      determine, based at least on an order of receiving the first file and the second file, the first file has precedence over the second file with respect to defining the first variable;
      determine, based at least on an order of appearance the first definition and the second definition within the first file, the first definition has precedence over the second definition with respect to defining the first variable;
      select the first definition as a controlling definition for the first variable, based at least on the determined precedence;
      select a controlling definition for a second variable, based at least on a determined file precedence for a plurality of files each having a definition for the second variable;
      generate a configuration file with the controlling definition for the first variable and the controlling definition for the second variable; and
      execute a continuous integration continuous delivery (CI/CD) pipeline dependent upon the configuration file, wherein at least one job in the CI/CD pipeline accesses one or more of the controlling definition for the first variable and the controlling definition for the second variable from the generated configuration file.

2. The system of claim 1, wherein the first file is received prior to the second file.

3. The system of claim 1, wherein the second file is received prior to the first file.

4. The system of claim 1, wherein the second definition appears earlier than the first definition within the first file or the first definition appears earlier than the second definition within the first file.

5. The system of claim 1, wherein the first file is a central file having one or more definitions and the second file is a file having application specific definitions, wherein the at least one memory and the computer program code are configured to, with the at least one processor, cause the at least one processor to further:
   determine a conflict of one or more of the application specific definitions in the second file with the one or more definitions in the first file; and
   discard the one or more of the application specific definitions in the second file in favor of the one or more definitions in the first file.

6. The system of claim 1, wherein the at least one memory and the computer program code are configured to, with the at least one processor, cause the at least one processor to further:
   receive a third file containing a fourth definition for the first variable,
   wherein select the first definition as a controlling definition for the first variable comprises select the first definition as a controlling definition for the first variable based at least on an order in which the first file, the second file, and the third file are received.

7. The system of claim 1, wherein the at least one memory and the computer program code are configured to, with the at least one processor, cause the at least one processor to further:
   receive a fourth file containing a plurality of parent keys, wherein each parent key has a definition for a third variable; and
   determine, based at least on an order in which the plurality of parent keys appear within the fourth file, a precedence for inheriting a controlling definition for the third variable,
   wherein generating the configuration file further comprises:
      generating the configuration file with the controlling definition for the third variable.

8. The system of claim 1, wherein the at least one memory and the computer program code are configured to, with the at least one processor, cause the at least one processor to further:
   determine a definition for a fourth variable based at least on a controlling definition of another variable.

9. The system of claim 1, wherein the at least one memory and the computer program code are configured to, with the at least one processor, cause the at least one processor to further:
   select a top-level key based at least on an environment name or a repository directory name.

10. The system of claim 1, wherein the at least one memory and the computer program code are configured to, with the at least one processor, cause the at least one processor to further:
    identify stages for the CI/CD pipeline to execute or to avoid executing,
    wherein executing the CI/CD pipeline comprises executing the CI/CD pipeline in accordance with the stages identified for execution and the stages identified for avoiding execution.

11. A computerized method for pipeline management, the computerized method comprising:
    receiving a first file containing a first definition and a second definition for a first variable, the second definition being different from the first definition;
    receiving a second file containing a third definition for the first variable;
    determining, based at least on an order of receiving the first file and the second file, the first file has precedence over the second file with respect to defining the first variable;
    determining, based at least on an order of appearance of the first definition and the second definition within the first file, the first definition has precedence over the second definition with respect to defining the first variable;
    selecting the first definition as a controlling definition for the first variable, based at least on the determined precedence;
    selecting a controlling definition for a second variable, based at least on a determined file precedence for a plurality of files each having a definition for the second variable;
    generating a configuration file with the controlling definition for the first variable and the controlling definition for the second variable; and executing a continuous integration continuous delivery (CI/CD) pipeline dependent upon the configuration file, wherein at least one job in the CI/CD pipeline accesses one or more of the controlling definition for the first variable and the controlling definition for the second variable from the generated configuration file.

12. The computerized method of claim 11, wherein the first file is received prior to the second file.

13. The computerized method of claim 11, wherein the second definition appears earlier than the first definition within the first file.

14. The computerized method of claim 11, further comprising:
   receiving a third file containing a fourth definition for the first variable,
   wherein select the first definition as a controlling definition for the first variable, comprises select the first definition as a controlling definition for the first variable based at least on an order in which the first file, the second file, and the third file are received.

15. The computerized method of claim 11, further comprising:
   receiving a fourth file containing a plurality of parent keys, wherein each parent key has a definition for a third variable, and
   determining, based at least on an order in which the plurality of parent keys appear within the fourth file, a precedence for inheriting a controlling definition for the third variable,
   wherein generating the configuration file further comprises:
      generating the configuration file with the controlling definition for the third variable.

16. The computerized method of claim 11, further comprising:
   determining a definition for a fourth variable based at least on a controlling definition of another variable.

17. The computerized method of claim 11, further comprising:
   selecting a top-level key based at least on an environment name or a repository directory name.

18. The computerized method of claim 11, further comprising:
   identifying stages for the CI/CD pipeline to execute or to avoid executing,
   wherein executing the CI/CD pipeline comprises executing the CI/CD pipeline in accordance with the stages identified for execution and the stages identified for avoiding execution.

19. One or more computer storage media having computer-executable instructions for pipeline management that, upon execution by a processor, cause the processor to at least:
   receive a first file containing a first definition for a first variable;
   receive a second file containing a second definition for the first variable;
   receive a third file containing a third definition for the first variable,
   determine, based at least on an order in which the first file, the second file, and the third file are received, the first file has precedence over the second file and the third file for defining the first variable;
   select the first definition as a controlling definition for the first variable, based at least on the determined precedence;
   select a controlling definition for a second variable, based at least on a determined file precedence for a plurality of files each having a definition for the second variable;
   receive a fourth file containing a plurality of parent keys, wherein each parent key has a definition for a third variable;
   determine, based at least on an order in which the plurality of parent keys appear within the fourth file, a precedence for inheriting a controlling definition for the third variable;
   generate a configuration file with the controlling definition for the first variable, the controlling definition for the second variable, and the controlling definition for the third variable; and
   execute a continuous integration continuous delivery (CI/CD) pipeline dependent upon the configuration file, wherein at least one job in the CD/CI pipeline accesses the controlling definitions of the first variable or the second variable or both from the generated configuration file.

20. The one or more computer storage media of claim 19, wherein the first file is received prior to the second file.

* * * * *